United States Patent
Kwon et al.

(10) Patent No.: US 7,870,821 B2
(45) Date of Patent: Jan. 18, 2011

(54) COFFEE MAKER AND MICROWAVE OVEN HAVING THE SAME

(75) Inventors: Jung Ju Kwon, Changwon-si (KR); Dae Sik Kim, Changwon-si (KR); Man Su Park, Changwon-si (KR); Wang Lim Lee, Busan-si (KR); Wan Je Cho, Masan-si (KR)

(73) Assignee: LG Electronics Inc., Seoul (KR)

( * ) Notice: Subject to any disclaimer, the term of this patent is extended or adjusted under 35 U.S.C. 154(b) by 1668 days.

(21) Appl. No.: 11/000,194

(22) Filed: Dec. 1, 2004

(65) Prior Publication Data

US 2005/0115412 A1    Jun. 2, 2005

(30) Foreign Application Priority Data

Dec. 2, 2003   (KR)  ..................... 10-2003-0086836

(51) Int. Cl.
 *A23C 15/04*   (2006.01)
(52) U.S. Cl. .............................. 99/483; 99/275; 99/279; 99/339; 99/340; 99/333
(58) Field of Classification Search ........... 99/327–333, 99/339–340, 357, 279–323, 275, DIG. 14, 99/391; D7/405–406, 351, 402; 219/689, 219/679, 678, 685, 680–682, 736, 739, 752–753, 219/756–758, 687
See application file for complete search history.

(56) References Cited

U.S. PATENT DOCUMENTS

| | | | |
|---|---|---|---|
| 5,300,743 A | | 4/1994 | Park |
| 5,491,322 A | * | 2/1996 | Waligorski .................. 219/689 |
| D479,431 S | * | 9/2003 | Jung et al. .................... D7/351 |
| 6,737,620 B2 | * | 5/2004 | Kim ............................ 219/679 |
| 7,186,960 B2 | * | 3/2007 | Cho et al. .................... 219/689 |
| 7,202,452 B2 | * | 4/2007 | Park et al. .................... 219/689 |
| D546,111 S | * | 7/2007 | Kim ............................. D7/305 |
| 7,358,468 B2 | * | 4/2008 | Kang .......................... 219/680 |
| 7,361,871 B2 | * | 4/2008 | Cho et al. .................... 219/689 |

(Continued)

FOREIGN PATENT DOCUMENTS

DE        19654497 A1    6/1998

(Continued)

*Primary Examiner*—Tu B Hoang
*Assistant Examiner*—Brett Spurlock
(74) *Attorney, Agent, or Firm*—Birch, Stewart, Kolasch & Birch, LLP (57) ABSTRACT

Provided is a coffee maker having a structure for preventing water from leaking while a water storage container is unloaded, and a microwave oven having the same. The coffee maker includes: a water storage container storing water for extracting coffee and having a drainage hole formed at one sided portion thereof; a tube guiding water drained through the drainage hole of the water storage container so as to extract coffee; and a connection unit having a first connector of which one end is connected to the water storage container, and a second connector of which one end is connected to the tube and the other end is separatably connected to the first connector. The connection unit communicates the water storage container with the tube and prevents water from leaking from at least one of the water storage container and the tube when the first connector and the second connector are separated from each other.

12 Claims, 4 Drawing Sheets

U.S. PATENT DOCUMENTS 7,446,290 B2 * 11/2008 Park et al. .................. 219/689
2004/0195534 A1 * 10/2004 Ijichi et al. ................. 251/63.5

FOREIGN PATENT DOCUMENTS

| | | | |
|---|---|---|---|
| EP | 1169957 A1 | | 1/2002 |
| EP | 1343356 A2 | | 9/2003 |
| JP | 09032947 A | * | 2/1997 |
| JP | 09-152083 | | 6/1997 |
| JP | 09152083 A | * | 6/1997 |
| RU | 2044511 C1 | | 9/1995 |
| WO | WO-04/000083 A1 | | 12/2003 |

* cited by examiner

FIG. 1

RELATED ART

COFFEE MAKER AND MICROWAVE OVEN HAVING THE SAME

This application claims the benefit of the Korean Application No. P 2003-86836 filed on Dec. 2, 2003 which is hereby incorporated by reference.

BACKGROUND OF THE INVENTION

1. Field of the Invention

The present invention relates to a coffee maker and a microwave oven having the same, and more particularly, to a coffee maker having a structure for preventing water from leaking while a water storage container is unloaded, and a microwave oven having the same.

2. Discussion of the Related Art

A microwave oven is an apparatus for cooking foods or thawing frozen foods using microwave.

The microwave oven is advancing so that it may further perform another function such as a coffee maker function as well as the simple function for cooking foods.

A microwave oven having such a coffee maker function will be described hereinafter.

The microwave oven includes a main body forming the appearance of the microwave oven, a cavity formed inside the main body and receiving an object food cooked by microwave, an electronic component chamber in which a variety of electronic components for providing the cavity with microwave are installed, and a coffee maker disposed at a front side of the electronic component chamber.

The coffee maker includes a case, a water storage container storing drinking water for extraction of coffee, a filter cap, a jug storing extracted coffee solution, a tube guiding the drinking water of the water storage container to the filter cap, and a heater heating a predetermined portion of the tube.

The filter cap is disposed at a lower side of the water storage container, and a paper filter is received in the filter cap for coffee extraction.

The jug is disposed below the filter cap to store the coffee solution extracted by the filter cap. The heater is disposed beneath the jug, e.g., on a bottom of the case.

The tube includes a drainage tube of which one end is connected with a drainage hole of the water storage container, a heating tube of which one end is connected to the other end of the drainage tube and which is heated by the heater, and a water feed tube of which one end is connected to the other end of the heating tube to feed drinking water to the filter cap.

Hereinafter, a connection structure between the drainage tube of the tube and the water storage container will be described with reference to FIG. 1.

Figure 1:
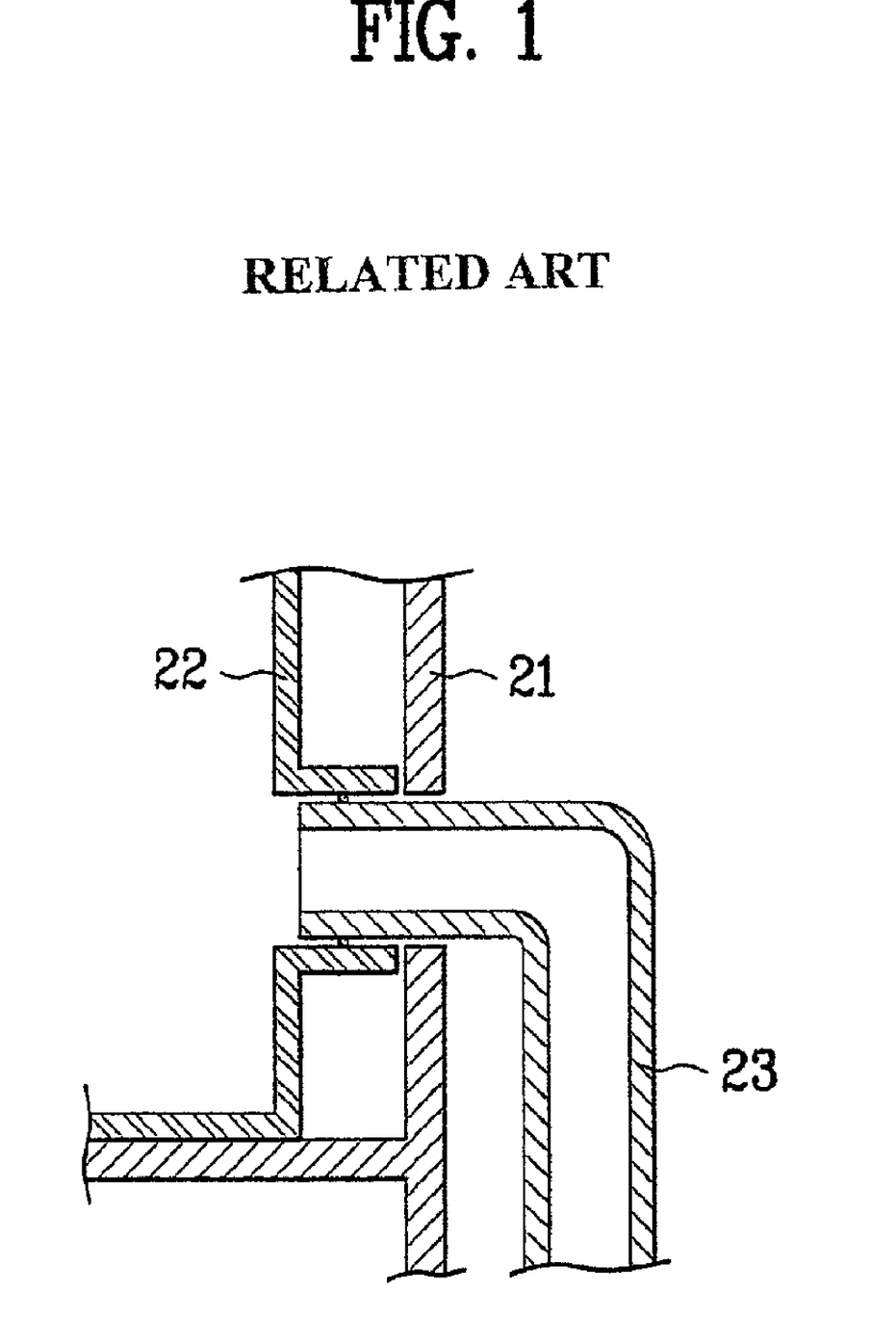
FIG. 1 is a sectional view illustrating a connection structure between a water storage container and a tube of a coffee maker provided in a related art microwave oven.

Referring to FIG. 1, a water storage, container 22 is detachably provided at an upper space inside a case 21. A drainage hole for draining drinking water is formed at a side portion of the water storage container 22.

A drainage tube 23 penetrates a wall of the case 21 and is insertedly connected to the drainage hole of the water storage container 22 to guide the drinking water stored in the water storage container 22 to a heating tube.

A sealing member such as an O-ring is provided between the drainage tube 23 and the drainage hole to prevent drinking water from leaking to a break between the drainage tube 23 and the drainage hole.

However, in the coffee maker provided in the microwave oven constructed as above, it is problematic that when the drainage tube 23 and the water storage container 22 are separated from each other, drinking water remaining in the drainage tube or the water storage container flows to an outside.

Also, it is problematic that the drinking water leaked to an outside may cause a short circuit of a magnetron.

SUMMARY OF THE INVENTION

Accordingly, the present invention is directed to a coffee maker and a microwave oven having the same that substantially obviate one or more problems due to limitations and disadvantages of the related art.

An object of the present invention is to provide a coffee maker constructed to prevent drinking water in a water storage container from leaking to an outside when the water storage container is separated from.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a coffee maker including: a water storage container storing water for extracting coffee and having a drainage hole formed at one sided portion thereof; a tube guiding water drained through the drainage hole of the water storage container so as to extract coffee; and a connection unit having a first connector of which one end is connected to the water storage container, and a second connector of which one end is connected to the tube and the other end is separatably connected to the first connector, wherein the connection unit communicates the water storage container with the tube and prevents water from leaking from at least one of the water storage container and the tube when the first connector and the second connector are separated from each other.

The first connector may include: a first connector main body connected to the water storage container and having a first water passage communicating with the drainage hole; and a first opening/closing unit selectively shielding the first water passage.

The first opening/closing unit may include a first valve unit provided on the first water passage, for selectively shielding the first water passage.

The first valve unit opens the first water passage by coupling the first connector with the second connector.

The first valve unit may include: a first valve body shielding the first water passage; and a first spring elastically supporting one sided portion of the first valve body, and the second connector may include a first pressing protrusion pressing the other sided portion of the first valve body such that the first water passage is opened.

The second connector may include: a second connector main body connected to the tube and having a second water passage communicating with the tube; and a second opening/closing unit selectively shielding the second water passage.

The second opening/closing unit may include a second valve unit provided on the second water passage, for selectively shielding the second water passage.

The second valve unit opens the second water passage by coupling the first connector with the second connector.

For this purpose, the second valve unit may include: a second valve body shielding the second water passage; and a second spring elastically supporting one sided portion of the second valve body, and the first connector may include a second pressing protrusion pressing the other sided portion of the second valve body such that the second water passage is opened.

Any one of the first connector and the second connector may be insertedly connected to the other one of the first connector and the second connector.

In another aspect of the present invention, there is provided a microwave oven including: a main body forming the appearance thereof; a cavity formed inside the main body and receiving an object food cooked by microwave; and a coffee maker disposed at one sided portion of the cavity.

The coffee maker includes: a water storage container storing water for extracting coffee and having a drainage hole formed at one sided portion thereof; a tube guiding water drained through the drainage hole of the water storage container so as to extract coffee; and a connection unit having a first connector of which one end is connected to the water storage container, and a second connector of which one end is connected to the tube and the other end is separatably connected to the first connector.

The connection unit communicates the water storage container with the tube and prevents water from leaking from at least one of the water storage container and the tube when the first connector and the second connector are separated from each other.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A microwave oven is an apparatus for cooking foods or thawing frozen foods using microwave.

The microwave oven is an apparatus for providing modern people pressed with busy daily life with cooked foods more rapidly and conveniently, and is advancing so that it may further perform a variety of functions besides the simple function for cooking foods.

Hereinafter, a coffee maker and a microwave oven having the same according to the present invention will be described with reference to FIG. 2.

Figure 2:
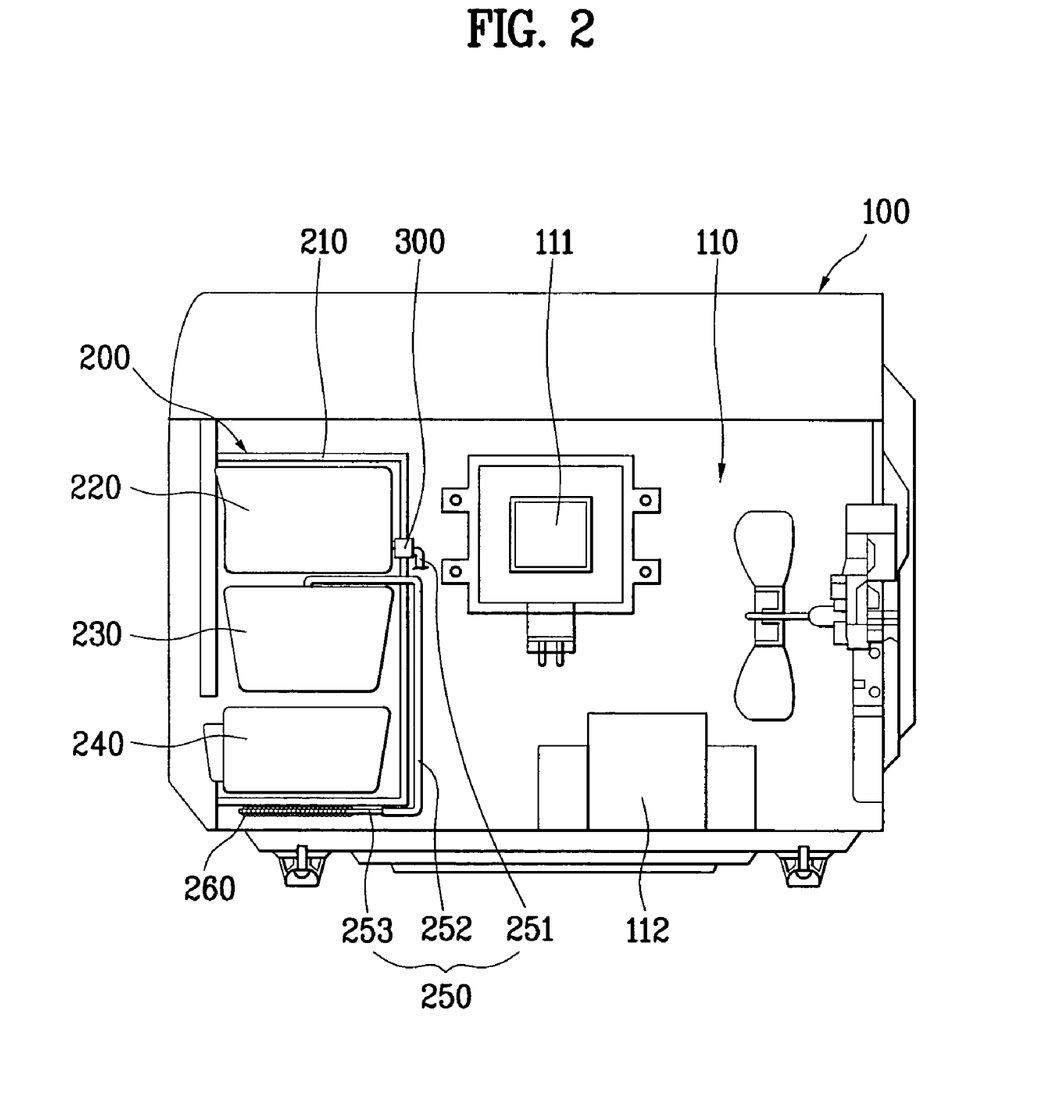
FIG. 2 is a schematic view of a microwave oven having a coffee maker according to an embodiment of the present invention.

FIG. 2 is a schematic view of a microwave oven having a coffee maker according to an embodiment of the present invention.

Referring to FIG. 2, the microwave oven includes a main body 100 forming the appearance of the microwave oven, a cavity (not shown) formed inside the main body 100 and receiving an object food, an electronic component chamber 110 disposed at one sided portion of the cavity, in which a variety of electronic components are installed, and a coffee maker 200 disposed at a front side of the electronic component chamber 110.

The cavity is a space where food is received and the received food is cooked. Functions and construction of the cavity will be omitted since they are the same as those in the related art microwave oven. Only, it is noted that the spatial size of the cavity may be different depending on a use purpose.

Inside the electronic component chamber 110, there are installed several electronic components including a magnetron 111 for generating microwave, a transformer 112 supplying the magnetron 111 with a high voltage, a cooling fan (not shown) for cooling heat generated while foods are cooked.

The coffee maker 220 includes a case disposed in front of the electronic component chamber 110, a water storage container 220 storing drinking water for extraction of coffee, a filter cap 230 inside which a paper filter is mounted, a jug 240 storing coffee solution extracted through the filter cap 230, a tube 250 guiding the drinking water of the water storage container 220 to the filter cap 230, and a heater 260 heating a predetermined portion of the tube 250.

The water storage container 220, the filter cap 230, the jug 240, and the heater 260 are disposed inside the case 210.

In more detail, the water storage container 220 is detachably received at an upper inner space of the case 210, and has a drainage hole formed at a side portion thereof, through which drinking water is drained.

The filter cap 230 is disposed below the water storage container 220, the jug 240 is disposed below the filter cap 230, and the heater 260 is disposed below the jug 240, i.e., on a bottom of the case 210.

The tube 250 includes a drainage tube 251 guiding the drinking water drained from the water storage container 220, a feed tube 252 supplying the filter cap 230 with heated drinking water, and a heating tube a heating tube connecting the drainage tube 251 with the feed tube 252 and heated by the heater 260.

In the meanwhile, a connection unit communicating the water storage container 220 with the tube 250 is disposed between the tube 250 and the water storage container 220.

The connection unit 300 provided in the coffee maker 200 of the present invention will now be described with reference to FIGS. 3 through 5.

Figure 3:
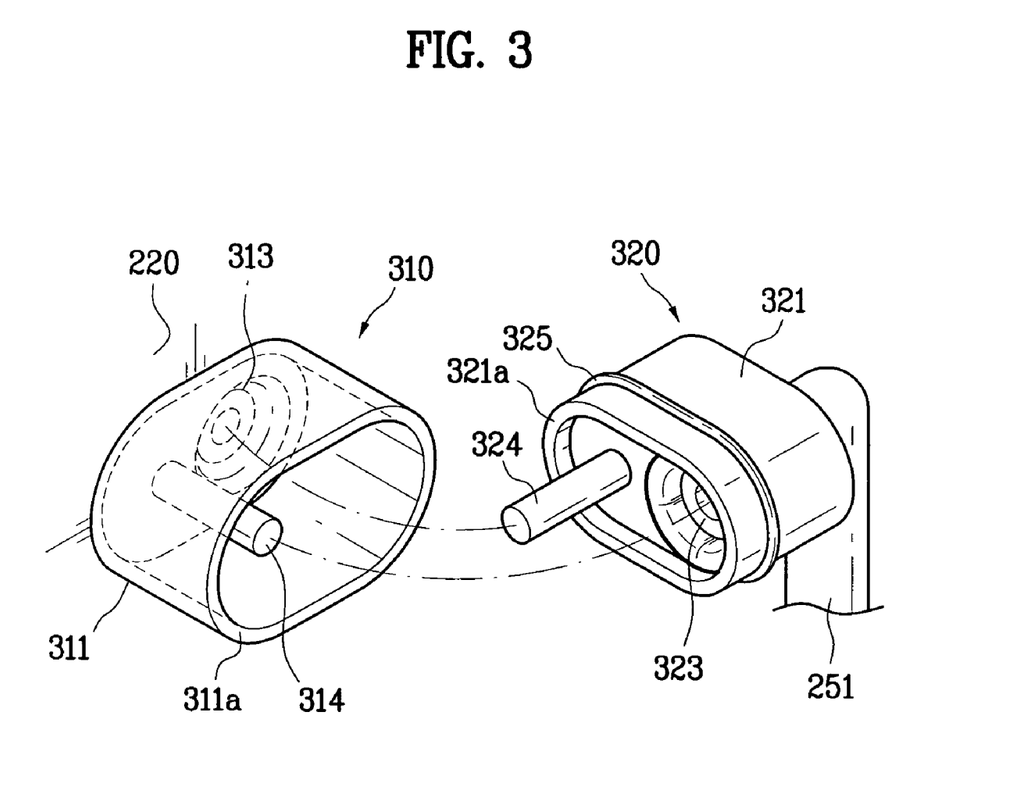
FIG. 3 is a dissembled perspective view of a connection unit provided in the coffee maker of FIG. 2.
Figure 4:
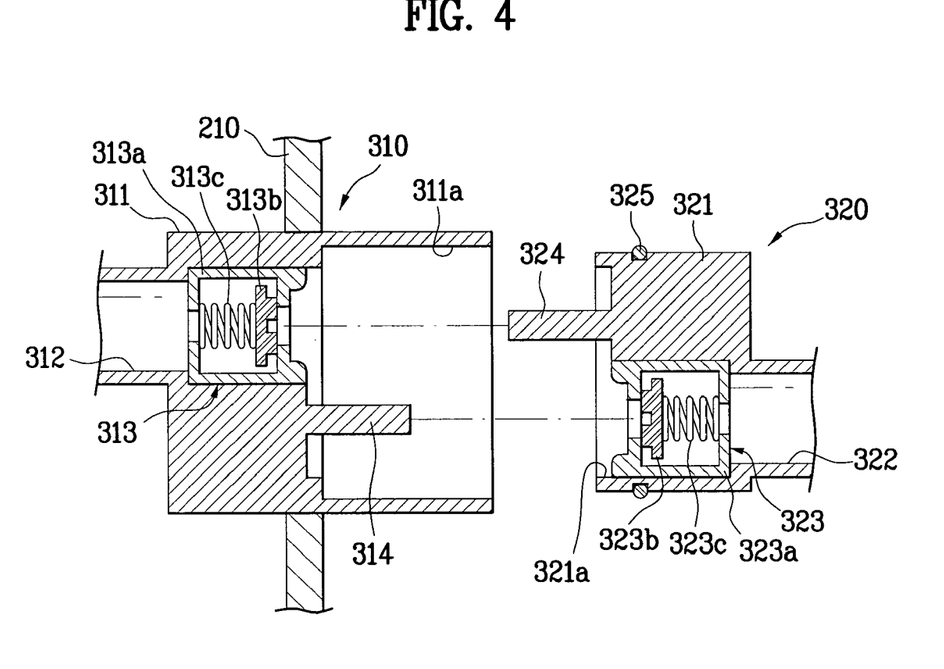
FIG. 4 is a sectional view of the connection unit shown in FIG. 3 and shows a separation of a first connector and a second connector.
Figure 5:
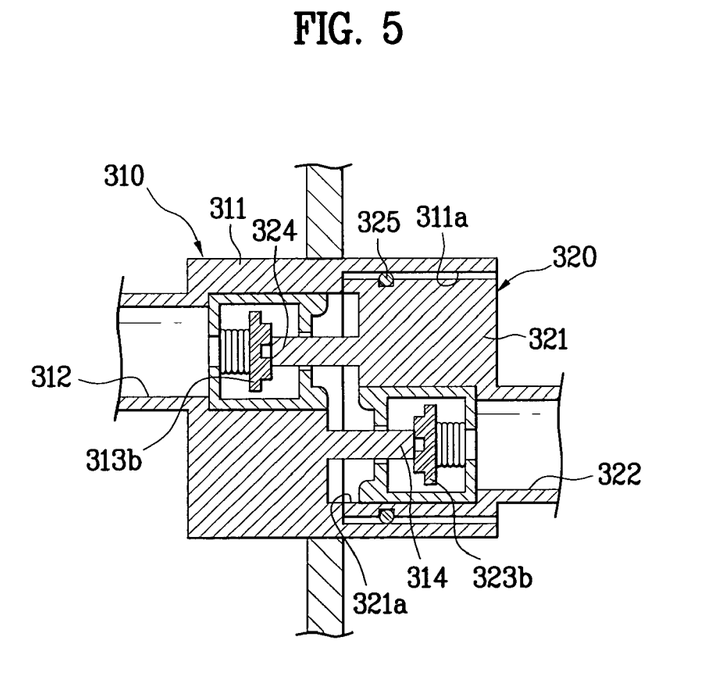
FIG. 5 is a sectional view of the connection unit shown in FIG. 3 and shows a coupling of a first connector and a second connector.

Herein, FIG. 3 is a dissembled perspective view of a connection unit provided in the coffee maker of FIG. 2, FIG. 4 is a sectional view of the connection unit shown in FIG. 3 and shows a separation of a first connector and a second connector, and FIG. 5 is a sectional view of the connection unit shown in FIG. 3 and shows a coupling of a first connector and a second connector.

Referring to FIGS. 3 through 5, the connection unit 300 includes a first connector 310 of which one end is connected to the water storage container 200, and a second connector 320 of which one end is connected to the tube 250 and the other end is separatably connected to the first connector 310.

The connection unit 300 prevents water from leaking from at least one of the water storage container 220 and the tube 250 when the first connector 310 and the second connector 320 are separated from each other.

More preferably, the connection unit 300 is constructed such that drinking water is not leaked to any one of the water storage container 220 and the tube 250 when the first connector 310 and the second connector 320 are separated from each other.

For this purpose, the first connector includes a first connector main body 311 of which one end is connected to the water storage container 220, a first water passage formed in the first connector main body 311 to communicate with the drainage hole of the water storage container 220, and a first opening/closing unit selectively shielding the first water passage 312.

The first connector main body 311 is formed integrally with the water storage container 220 or is separatably fixed to the water storage container 220.

The first opening/closing unit includes a first valve unit 313 provided on the first water passage 312, for selectively shielding the first water passage 312.

The first valve unit 313 is constructed to open the first water passage 312 by coupling the first connector 310 with the second connector 320.

For this purpose, the first valve unit 313 includes a first valve housing 313a disposed in the first water passage 312, a first valve body 313b disposed inside the first valve housing 313a, and a first elastic member elastically supporting the first valve body 313b.

The first valve housing 313a has a hollow penetrating in the same direction as an axial direction of the first water passage 312.

In addition, the elastic member is preferably a first spring 313c made of a material against rust.

The first spring 313c is constructed such that one end thereof is supported by one end of the hollow of the first valve housing 313a and the other end of the first spring 313c supports one end of the first valve body 313b.

By doing so, the first valve body 313b shields the other end of the hollow of the first valve housing 313a so that the first water passage 312 is shielded.

The second connector 320 includes a first pressing protrusion 324 corresponding to the first valve body 313b such that the first water passage 312 is opened by a coupling of the first connector 310 and the second connector 320.

By the above construction, if the first connector 310 is coupled with the second connector 320, the first pressing protrusion 324 presses the other end of the first valve body 313b, so that the hollow of the first valve housing 313a is opened, resulting in the opening of the first water passage 312.

Next, the second connector 320 includes a second connector main body 321 of which one end is connected to one end of the drainage tube 251, a second water passage 322 formed in the second connector main body 321 and communicating with the drainage tube 251, and a second opening/closing unit selectively shielding the second water passage 322.

The second connector main body 321 is formed integrally with or is separatably fixed to the drainage tube 251 of the tube. The second water passage 322 is formed one sided portion of the first pressing protrusion 324.

The second opening/closing unit includes a second valve unit 323 provided on the second water passage 322, for selectively shielding the second water passage 322.

The second valve unit 323 is constructed to open the second water passage 322 by coupling the first connector 310 with the second connector 320.

For this purpose, the second valve unit 323 includes a second valve housing 323a disposed in the second water passage 322, a second valve body 323b disposed inside the second valve housing 323a, and a second elastic member elastically supporting the second valve body 313b.

The second valve housing 323a has a hollow penetrating in the same direction as an axial direction of the second water passage 322.

In addition, the elastic member is preferably a second spring 323c made of a material against rust.

The second spring 323c is constructed such that one end thereof is supported by one end of the hollow of the second valve housing 323a and the other end thereof supports one end of the second valve body 323b.

By doing so, the second valve body 323b shields the other end of the hollow of the second valve housing 323a so that the second water passage 322 is shielded.

Also, the first connector main body 311 includes a second pressing protrusion 314 formed at the other sided portion thereof and corresponding to the second valve body 323b such that the second water passage 322 is opened by a coupling of the first connector 310 and the second connector 320.

Herein, the second pressing protrusion 314 is formed at one sided portion of the first water passage 312.

In the meanwhile, the second connector 320 is insertedly connected with the first connector 310.

For this purpose, the first connector main body 311 has an edge portion 311a formed at an edge of the other sided portion thereof, protruded toward the second connector 320 and shaped corresponding to the appearance of the first connector main body 311. The edge portion 311a surrounds a front part of the second connector 320 while the interval maintenance protrusion 321a is inserted into the first connector main body 311.

Preferably, the second connector main body 321 further includes a sealing member 325 formed on an outer circumference thereof, for preventing drinking water from leaking between the edge portion 311a of the first connector 310 and the second connector main body 321.

Besides the above elements, the second connector main body 321 further includes an interval maintenance protrusion 321a formed at the other sided portion thereof and protruded toward the first connector 310 by a predetermined length. The interval maintenance protrusion 321a contacts the other sided portion of the first connector main body 311 when the first connector 310 is coupled with the second connector 320.

The interval maintenance protrusion 321a has a length that is shorter than those of the first pressing protrusion 324 and the second pressing protrusion 314.

Accordingly, when the first connector 310 and the second connector 320 are coupled with each other, a flow space having a predetermined size is formed inside the connection unit 300, i.e., between the first connector 310 and the second connector 320 to communicate the first water passage 312 with the second water passage 322.

Of course, it will be apparent that the first connector 310 can be inserted into and connected with the second connector 320 from the above description.

Next, a selective communication of the water storage container 220 and the drainage tube 251 of the tube by the connection unit 300 constructed as above will be described.

First, as a user separates the water storage container 220 from the case 210, supplies the water storage container 220 with drinking water, and installs the water storage container 220 inside the case 210, the first connector 310 and the second connector 320 are coupled with each other.

When the second connector 320 is inserted into and coupled with the edge portion 311a of the first connector 310, the interval maintenance protrusion 321a of the second connector 320 is closely in contact with the other sided portion of the first connector main body 311.

As the first pressing protrusion 324 presses the first valve body 313b, the first spring 313c is compressively deformed, so that the first water passage 312 is opened.

Concurrently with the opening of the first water passage 312, the second pressing protrusion 314 presses the second valve body 323b, so that the second spring 323c is compressively deformed and the second water passage 322 is opened.

The opening of the first water passage 312 and the second water passage 322 starts when the sealing member 325 of the second connector 320 is inserted into an inside of the edge portion 311a by a predetermined depth.

As above, if the first water passage 312 and the second water passage 322 are opened, the drinking water stored in the water storage container 220 is drained through the drainage hole of the water storage container 220 and is then introduced into the drainage tube 251 through the first water passage 312, the flow space formed by the first connector 310 and the second connector 320, and the second water passage 322.

On the contrary, if the water storage container 220 is separated from the case 210, the first connector 310 and the second connector 320 are separated from each other, so that the first pressing protrusion 324 and the second pressing protrusion 314 are respectively separated from the first valve body 313b and the second valve body 323b.

Accordingly, the first spring 313c and the second spring 323c are restored and the first water passage 312 and the second water passage 322 are shielded, so that the drinking water of the water storage container 220 and the drainage tube 251 is not leaked to an outside.

The present invention constructed as above has the following effects.

First, in a coffee maker and a microwave oven having the same of the present invention, a connection unit communicating a water storage container with a tube is provided so that drinking water can be prevented from leaking from the water storage container and the tube when the water storage container is separated.

Also, in the coffee maker and microwave oven having the same of the present invention, since the connection unit prevents water leakage, a variety of electronic components are prevented from being damaged and from being short-circuited.

Further, in the coffee maker and microwave oven having the same of the present invention, a first connector coupled to the water storage container and a second connector coupled to the tube are provided to enable an exact and easy installation of the water storage container.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A coffee maker comprising:
   a water storage container for storing water for extracting coffee and having a drainage hole formed at one sided portion thereof;
   a tube for guiding water drained through the drainage hole of the water storage container to a portion for extracting coffee; and
   a connection unit having a first connector of which one end is connected to the water storage container, and a second connector of which one end is connected to the tube and the other end is separably connected to the first connector,
   wherein the first connector comprises:
      a first water passage communicating with the drainage hole and a first opening/closing unit,
      a second pressing protrusion, and
      the first opening/closing unit, wherein the first opening/closing unit includes a first valve unit provided on the first water passage for selectively shielding the first water passage, and the first valve unit includes a first valve body and a first elastic member;
   wherein the second connector comprises:
      a second water passage communicating with the tube and a second opening/closing unit,
      a first pressing protrusion, and
      the second opening/closing unit, wherein the second opening/closing unit includes a second valve unit provided on the second water passage for selectively shielding the second water passage, and the second valve unit includes a second valve body and a second elastic member;
   wherein the connection unit is adapted to communicate the water storage container with the tube, the first valve unit and the first elastic member are adapted to shield the first water passage to prevent water from leaking from the water storage container when the first connector and the second connector are separated from each other, and the second valve unit and the second elastic member are adapted to shield the second water passage to prevent water from leaking from the tube when the first connector and the second connector are separated from each other, and
   wherein when the first connector and the second connector are attached to each other the first pressing protrusion is inserted into the first valve unit to push the first valve body and the first elastic member to open the first water passage, the second pressing protrusion is inserted into the second valve unit to push the second valve body and the second elastic member to open the second water passage, and the first pressing protrusion and the second pressing protrusion are offset from each other.

2. The coffee maker of claim 1, wherein the first connector comprises:
   a first connector main body connected to the water storage container and having the first water passage and the first opening/closing unit.

3. The coffee maker of claim 1, wherein the first elastic member elastically supports one side portion of the first valve body.

4. The coffee maker of claim 1, wherein the second connector comprises:
   a second connector main body connected to the tube and having the second water passage communicating with the tube and the second opening/closing unit.

5. The coffee maker of claim 1, wherein the second elastic member elastically supports one side portion of the second valve body.

6. The coffee maker of claim 1, wherein one of the first connector and the second connector is insertedly connectable to the other one of the first connector and the second connector.

7. A microwave oven comprising:
a main body forming the appearance thereof;
a cavity formed inside the main body and receiving a an object food cooked by microwave; and
a coffee maker disposed at one sided portion of the cavity, wherein the coffee maker comprises:
a water storage container for storing water for extracting coffee and having a drainage hole formed at one sided portion thereof;
a tube for guiding water drained through the drainage hole of the water storage container to a portion for extracting coffee; and
a connection unit having a first connector of which one end is connected to the water storage container, and a second connector of which one end is connected to the tube and the other end is separably connected to the first connector,
wherein the first connector comprises:
a first water passage communicating with the drainage hole and a first opening/closing unit, and
a second pressing protrusion,
wherein the first opening/closing unit includes a first valve unit provided on the first water passage for selectively shielding the first water passage, the first valve unit includes a first valve body and a first elastic member;
wherein the second connector comprises:
a second water passage communicating with the tube and a second opening/closing unit, and
a first pressing protrusion,
wherein the second opening/closing unit includes a second valve unit provided on the second water passage for selectively shielding the second water passage, the second valve unit includes a second valve body and a second elastic member;
wherein the connection unit is adapted to communicate the water storage container with the tube, the first valve unit and the first elastic member are adapted to shield the first water passage to prevent water from leaking from the water storage container when the first connector and the second connector are separated from each other, and the second valve unit and the second elastic member are adapted to shield the second water passage to prevent water from leaking from the tube when the first connector and the second connector are separated from each other, and
wherein when the first connector and the second connector are attached to each other the first pressing protrusion is inserted into the first valve unit to push the first valve body and the first elastic member to open the first water passage, the second pressing protrusion is inserted into the second valve unit to push the second valve body and the second elastic member to open the second water passage, and the first pressing protrusion and the second pressing protrusion are offset from each other.

8. The microwave oven of claim 7, wherein the first connector comprises:
a first connector main body connected to the water storage container and having the first water passage and the first opening/closing unit.

9. The microwave oven of claim 7, wherein the first elastic member elastically supports one side portion of the first valve body.

10. The microwave oven of claim 7, wherein the second connector comprises:
a second connector main body connected to the tube and having the second water passage communicating with the tube, and the second opening/closing unit.

11. The microwave oven of claim 7, wherein the second elastic member elastically supports one side portion of the second valve body.

12. The microwave oven of claim 7, wherein one of the first connector and the second connector is insertedly connectable to the other one of the first connector and the second connector.

* * * * *